(12) United States Patent
Nimori

(10) Patent No.: US 9,810,326 B2
(45) Date of Patent: Nov. 7, 2017

(54) STEAM VALVE

(71) Applicant: KABUSHIKI KAISHA TOSHIBA, Minato-ku (JP)

(72) Inventor: Miyako Nimori, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/666,842

(22) Filed: Mar. 24, 2015

(65) Prior Publication Data

US 2015/0276067 A1 Oct. 1, 2015

(30) Foreign Application Priority Data

Mar. 31, 2014 (JP) .................................. 2014-071306

(51) Int. Cl.
*F16K 1/42* (2006.01)
*F01D 17/14* (2006.01)
*F16K 27/02* (2006.01)

(52) U.S. Cl.
CPC .............. *F16K 1/42* (2013.01); *F01D 17/145* (2013.01); *F16K 27/02* (2013.01); *F05D 2220/31* (2013.01)

(58) Field of Classification Search
CPC .......... F16K 1/42; F16K 27/02; F01D 17/145; F05D 2220/31
USPC ................... 251/120–122, 359–365
See application file for complete search history.

(56) References Cited

U.S. PATENT DOCUMENTS

| 1,891,460 | A | * | 12/1932 | Vlahek | ................... F16K 1/427 |
| | | | | | 251/359 |
| 2,887,295 | A | | 5/1959 | Bredtschneider et al. | |
| 3,834,666 | A | * | 9/1974 | Keith | ....................... F16K 1/34 |
| | | | | | 137/625.38 |
| 4,132,386 | A | * | 1/1979 | Lee | ........................ F16K 1/465 |
| | | | | | 251/171 |
| 4,542,879 | A | * | 9/1985 | Stein | ........................ F16K 1/34 |
| | | | | | 251/360 |

(Continued)

FOREIGN PATENT DOCUMENTS

| DE | 1 048 928 B | 1/1959 |
| DE | 200 06 775 U1 | 8/2000 |

(Continued)

OTHER PUBLICATIONS

Extended Search Report dated Aug. 17, 2015 in European Patent Application No. 15161609.1.

(Continued)

*Primary Examiner* — John Bastianelli

(74) *Attorney, Agent, or Firm* — Oblon, McClelland, Maier & Neustadt, L.L.P.

(57) ABSTRACT

A steam valve of an embodiment includes a casing, a valve rod, a valve element, and a valve seat. At the casing, the steam flows from an inlet into an inner space, and flows out of an outlet. The valve rod is accommodated in the inner space. The valve element is coupled to the valve rod at the inner space. The valve seat is fixed to the casing at the inner space, and includes a part where the valve element is in contact by moving together with the valve rod along an axis of the valve rod. Each of the valve seat and the casing includes a plane facing via a gap at a downstream side than a part where the valve seat and the valve element are in contact at the inner space. The valve seat has a cover part which covers the gap at the inner space.

8 Claims, 11 Drawing Sheets

(56) References Cited

U.S. PATENT DOCUMENTS

2013/0092080 A1* 4/2013 Huddleston ............... B05C 5/00
251/359

FOREIGN PATENT DOCUMENTS

| EP | 2 216 515 A1 | 8/2010 |
|---|---|---|
| JP | 2004-116607 A | 4/2004 |
| JP | 2012-032248 | 2/2012 |
| JP | 2013-029074 A | 2/2013 |

OTHER PUBLICATIONS

Office Action dated Dec. 20, 2016 in Japanese Patent Application No. 2014-071306 (with English translation).

* cited by examiner

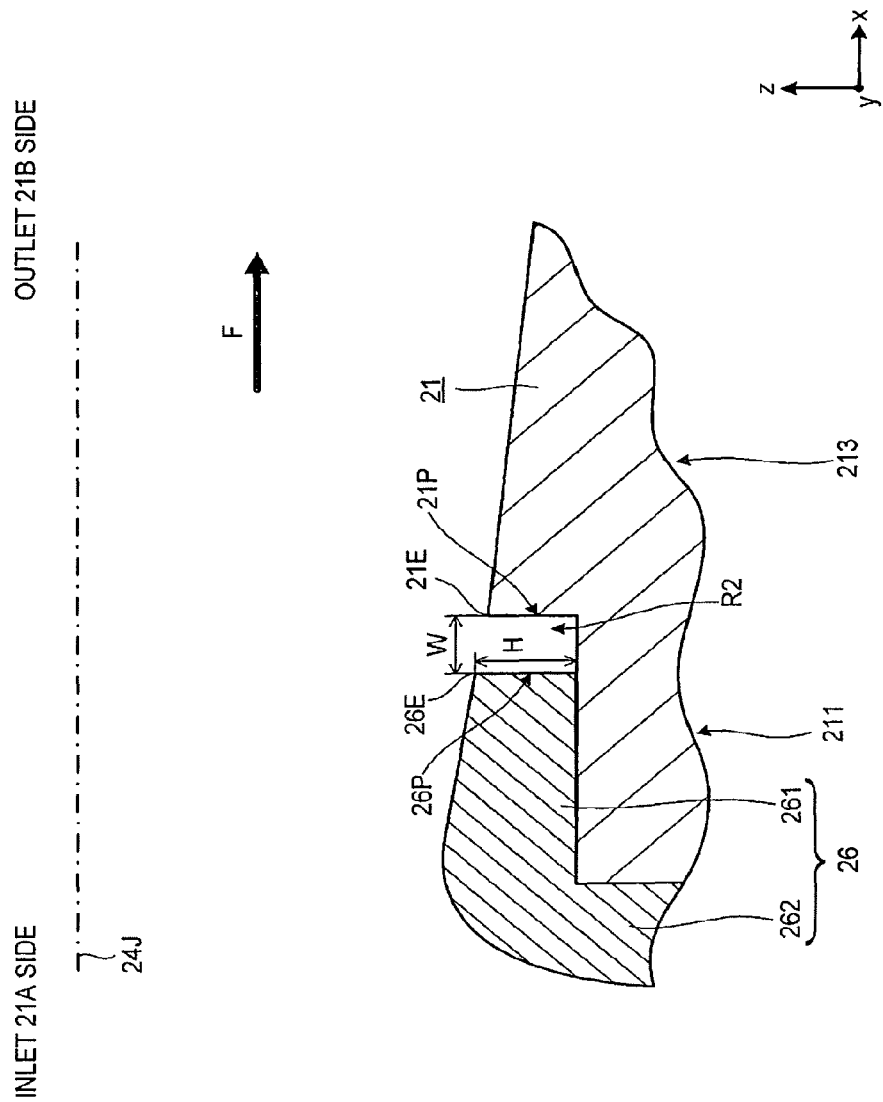

STEAM VALVE

CROSS-REFERENCE TO RELATED APPLICATION

This application is based upon and claims the benefit of priority from Japanese Patent Application No. 2014-071306, filed on Mar. 31, 2014; the entire contents of which are incorporated herein by reference.

FIELD

Embodiments described herein relate generally relate to a steam valve.

BACKGROUND

In a steam turbine system, steam valves such as a steam stop valve, a steam control valve are provided at a pipe. In the steam turbine system, a flow rate and so on of steam transferred from a boiler to a steam turbine is adjusted by the steam valves such as the steam control valve.

[A] Whole Configuration of Steam Stop Valve, Steam Control Valve

FIG. 9 is a perspective view illustrating an example of a steam stop valve and a steam control valve.

As illustrated in FIG. 9, a pre-valve drain pipe P1a and a post-valve drain pipe P1b are provided at a steam stop valve V1. The pre-valve drain pipe P1a is provided at an upstream side of a valve seat (not-illustrated) constituting the steam stop valve V1. On the other hand, the post-valve drain pipe P1b is provided at a downstream side of the valve seat (not-illustrated) constituting the steam stop valve V1. A shutoff valve (not-illustrated) is provided at each of the pre-valve drain pipe P1a and the post-valve drain pipe P1b.

As illustrated in FIG. 9, a post-valve drain pipe P2 is provided at a steam control valve V2. The post-valve drain pipe P2 is provided at a downstream side of a valve seat (not-illustrated) constituting the steam control valve V2. The shutoff valve (not-illustrated) is provided at a post-valve drain pipe P2 as same as the above.

In a steam turbine system, for example, the shutoff valve (not-illustrated) is opened when warming is performed for a steam turbine, and drain water is discharged to a steam condenser (not-illustrated) via the shutoff valve. After the warming is completed, the shutoff valve (not-illustrated) is closed.

[B] Detailed Configuration of Steam Control Valve

FIG. 10 is a sectional view schematically illustrating an example of the steam control valve. In FIG. 10, a vertical plane (an xz plane) defined by a direction x (an axial direction where a valve rod 24 extends) along an axis 24J of the valve rod 24 in a horizontal plane (an xy plane) and a vertical direction z perpendicular to the horizontal plane (the xy plane) is illustrated. Besides, in FIG. 10, flows of steam F are represented by thick arrows.

The steam control valve V2 has a casing 21, an upper cover 22, a sleeve 23, the valve rod 24, a valve element 25, and a valve seat 26 as illustrated in FIG. 10, and adjusts a flow rate of the steam F supplied to a steam turbine (not-illustrated) via the steam stop valve V1 (refer to FIG. 9). Each part is formed by, for example, a metal material.

At the steam control valve V2, the casing 21 includes an inner space 21C, and an inlet 21A and an outlet 21B are formed at the inner space 21C. At the casing 21, when the steam control valve V2 is opened, the steam F flows from the inlet 21A into the inner space 21C, and the steam F flows toward outside from the outlet 21B. At the casing 21, the inlet 21A is provided at an upper end part. The outlet 21B is provided at one end part (at a right end part in FIG. 10) in the direction x along the axis 24J of the valve rod 24 in the horizontal plane (the xy plane). Besides, at the casing 21, an opening 21K is formed at the other end part (at a left end part in FIG. 10) in the direction x along the axis 24J of the valve rod 24. In the casing 21, a part at the inlet 21A side is tubular, and a tube axis takes along the vertical direction z. Besides, in the casing 21, a part at the outlet 21B side is tubular, and a tube axis coincides with the direction x along the axis 24J of the valve rod 24. Namely, the part at the outlet 21B side is coaxial to the axis 24J of the valve rod 24.

The upper cover 22 is provided at the other end part (at the left side in FIG. 10) at the casing 21, and blocks the opening 21K of the casing 21. Here, a through hole 22K is formed at a center part of the upper cover 22. The through hole 22K of the upper cover 22 extends in the direction x along the axis 24J of the valve rod 24, and is coaxial to the axis 24J of the valve rod 24. At the upper cover 22, a tubular bush 22b penetrates and is fixed to an inside of the through hole 22K, and the valve rod 24 penetrates an inside of the bush 22b.

The sleeve 23 is accommodated in the inner space 21C of the casing 21. The sleeve 23 is, for example, a cylindrical tubular body, and is disposed to be coaxial to the axis 24J of the valve rod 24. An inside diameter of the sleeve 23 is constant in the direction x along the axis 24J of the valve rod 24. Besides, a part positioning at an upstream side (at the inlet 21A side) of an outside diameter of the sleeve 23 is constant in the direction x along the axis 24J of the valve rod 24. On the other hand, the outside diameter of the sleeve 23 is not constant at a part positioning at a downstream side (at the outlet 21B side). The outside diameter of the sleeve 23 becomes small as it goes from the upstream side (the inlet 21A side) toward the downstream side (the outlet 21B side). Besides, an end part (a left end part in FIG. 10) positioning at one side of the sleeve 23 in the direction x along the axis 24J of the valve rod 24 is fixed to the upper cover 22. The sleeve 23 accommodates the bush 22b, the valve rod 24, and the valve element 25 at an inside thereof.

The valve rod 24 is accommodated in the inner space 21C of the casing 21. The valve rod 24 penetrates the through hole 22K of the upper cover 22 via the bush 22b. The valve rod 24 is, for example, a columnar rod-shaped body, and the axis 24J takes along the horizontal plane (the xy plane). The valve rod 24 is provided at the inside of the bush 22b so as to move in the direction x where the axis 24J takes along.

The valve element 25 is accommodated in the inner space 21C of the casing 21. The valve element 25 includes, for example, a part being the cylindrical tubular body, and the part being the tubular body is disposed to be coaxial to the valve rod 24. At the valve element 25, a part positioning at one side (at a left part in FIG. 10) in the direction x along the axis 24J of the valve rod 24 is accommodated at an inside of the sleeve 23. Besides, at the valve element 25, an end part positioning at the other side (at a right end part in FIG. 10) in the direction x along the axis 24J of the valve rod 24 is a curved surface. The valve element 25 is coupled to one end (the right end in FIG. 10) of the valve rod 24 at the inside of the sleeve 23, and moves along the axis 24J together with the valve rod 24.

The valve seat 26 is accommodated in the inner space 21C of the casing 21. The valve seat 26 is, for example, a cylindrical tubular body, and is disposed to be coaxial to the valve rod 24. The valve seat 26 is provided at a part at the outlet 21B side at the casing 21, and is fixed to an inner peripheral surface of the casing 21. The valve seat 26 includes a part where the valve element 25 is in contact when the valve element 25 moves together with the valve rod 24 in the direction x along the axis 24J of the valve rod 24. The valve seat 26 is formed with a material which is easy to be expanded by heat than the casing 21.

Specifically, an outer peripheral surface of the valve seat 26 takes along the direction x along the axis 24J of the valve rod 24. Here, a step is formed at the outer peripheral surface of the valve seat 26. At the valve seat 26, an outside diameter of a part positioning at the upstream side (the inlet 21A side) is larger than an outside diameter of a part positioning at the downstream side (the outlet 21B side). Namely, a projecting part projecting toward outside in a radial direction (a longitudinal direction in FIG. 10) of the valve rod 24 is formed at the part positioning at the upstream side (the inlet 21A side) within the outer peripheral surface of the valve seat 26. This projecting part is projecting toward outside from a center where the axis 24J of the valve rod 24 penetrates at the vertical plane (the yz plane) which is perpendicular to the direction x along the axis 24J of the valve rod 24.

An inner peripheral surface of the valve seat 26 includes a part inclining relative to the direction x along the axis 24J of the valve rod 24, and an inside diameter of the inclining part becomes large as it goes from the upstream side (the inlet 21A side) toward the downstream side (the outlet 21B side). Namely, the inner peripheral surface of the valve seat 26 includes the part inclining relative to the direction x along the axis 24J of the valve rod 24 such that the upstream side (the inlet 21A side) positions at an inner side in the radial direction of the valve rod 24 than the downstream side (the outlet 21B side).

An end part of the valve seat 26 positioning at the upstream side (the inlet 21A side) in the direction x along the axis 24J of the valve rod 24 is a curved surface.

Besides, at the casing 21, steps are formed at the inner peripheral surface of a part at the outlet 21B side. Here, at the casing 21, the part at the outlet 21B side includes a first valve seat mounting part 211 where a part at the downstream side (the outlet 21B side) of the valve seat 26 is mounted, a second valve seat mounting part 212 where a part at the upstream side (the inlet 21A side) of the valve seat 26 is mounted, and a valve seat downstream part 213 positioning at the downstream side (the outlet 21B side) than the valve seat 26.

In the casing 21, at the first valve seat mounting part 211, the inner peripheral surface is in parallel to the direction x along the axis 24J of the valve rod 24. An inside diameter of the first valve seat mounting part 211 is the same as the outside diameter of the part positioning at the downstream side (the outlet 21B side) of the valve seat 26. Namely, at the first valve seat mounting part 211, the inner space 21C is a columnar shape.

In the casing 21, at the second valve seat mounting part 212, the inner peripheral surface is in parallel to the direction x along the axis 24J of the valve rod 24. An inside diameter of the second valve seat mounting part 212 is the same as the outside diameter of the part positioning at the upstream side (the inlet 21A side) of the valve seat 26. Namely, at the second valve seat mounting part 212, the inner space 21C is the columnar shape, and a diameter thereof is larger than the first valve seat mounting part 211.

In the casing 21, an inner peripheral surface of the valve seat downstream part 213 is not in parallel to the direction x along the axis 24J of the valve rod 24, and includes an inclining part. An inside diameter of the valve seat downstream part 213 at the first valve seat mounting part 211 side is smaller than the inside diameter of the first valve seat mounting part 211 and the inside diameter of the second valve seat mounting part 212. The inside diameter of the valve seat downstream part 213 becomes large as it goes from the upstream side (the inlet 21A side) toward the downstream side (the outlet 21B side). Namely, at the valve seat downstream part 213, the inner space 21C is a truncated conical shape. Here, each of the inner peripheral surface of the valve seat downstream part 213 and the inner peripheral surface of the part positioning at the downstream side (the outlet 21B side) of the valve seat 26 has the same inclining angle relative to the axis 24J of the valve rod 24 with each other, and both are formed to take along one surface.

The outer peripheral surface of the valve seat 26 is in close contact with each of inner peripheral surfaces of the first valve seat mounting part 211 and the second valve seat mounting part 212.

Other than the above, the valve seat 26 and the casing 21 respectively include planes 21P, 26P facing with each other via a gap R2 at the downstream side (the outlet 21B side) compared to the part where the valve seat 26 and the valve element 25 are in contact at the inner space 21C. Namely, the gap R2 is sandwiched between the plane 26P positioned at an end part at the downstream side (the outlet 21B side) of the valve seat 26 and the plane 21P of the casing 21 which faces the plane 26P. The gap R2 is a part dented at an inner peripheral surface of the inner space 21C, and is communicated with the inner space 21C.

Here, the gap R2 is formed to surround a periphery of the axis 24J of the valve rod 24 in a ring state. The ring constituted by the gap R2 is coaxial to the valve rod 24, and the center axis coincides with the axis 24J of the valve rod 24. The gap R2 is provided to prevent that the plane 26P positioned at the end part at the downstream side (the outlet 21B side) of the valve seat 26 is in contact with the plane 21P of the casing 21 when the valve seat 26 expands by the steam F to be larger than the casing 21 and extends in the direction x along the axis 24J of the valve rod 24.

At the steam control valve V2, the valve rod 24 is further coupled to a driving device (not-illustrated) at outside of the casing 21, and the driving device (not-illustrated) moves the valve rod 24 along the axis 24J. At the steam control valve V2, a distance between the valve element 25 and the valve seat 26 is thereby changed, an opening degree is adjusted, and the flow rate of the steam is controlled. The driving device (not-illustrated) includes, for example, an oil cylinder and a spring. The steam control valve V2 is opened by an action of a hydraulic pressure, and the steam control valve V2 is closed by an action of a spring force.

In more detail, when the steam control valve V2 is opened, the valve element 25 is away from the valve seat 26 in the inner space 21C of the casing 21. The steam F flowing into the inlet 21A of the casing 21 thereby flows in the inner space 21C, and is discharged from the outlet 21B of the casing 21. On the other hand, when the steam control valve V2 is closed, the valve element 25 is in contact with the valve seat 26, and the flow of the steam F is stopped.

At the steam control valve V2, for example, the driving device (not-illustrated) adjusts the distance between the valve element 25 and the valve seat 26 in accordance with a control signal output from a control device (not-illustrated), and thereby, the flow rate of the steam F flowing at the steam control valve V2 is controlled.

Note that though it is not-illustrated in FIG. 10, at the steam control valve V2, the post-valve drain pipe P2 (refer to FIG. 9) is coupled to a part positioning at the downstream side (the outlet 21B side) than the valve seat 26.

[C] Cavity Tone

FIG. 11 is a sectional view enlargedly illustrating a part in an example of a steam control valve. In FIG. 11, a part A in FIG. 10 is enlargedly illustrated. Here, at the steam control valve V2, a part where the valve seat 26 is mounted on the casing 21 is illustrated. In FIG. 11, as same as FIG. 10, the vertical plane (the xz plane) defined by the direction x (the axial direction where the valve rod 24 extends) along the axis 24J of the valve rod 24 in the horizontal plane (the xy plane) and the vertical direction z perpendicular to the horizontal plane (the xy plane) is illustrated. Besides, in FIG. 11, the flow of the steam F is illustrated by the thick arrow. Note that in FIG. 11, a size of each part is different from FIG. 10.

Though it is already described, as illustrated in FIG. 11, the gap R2 is formed at the part positioning at the downstream side (the outlet 21B side) than the part where the valve element 25 and the valve seat 26 are in contact within an inner peripheral surface of the steam control valve V2 (refer to FIG. 10). Accordingly, there is a case when so-called a cavity tone occurs resulting from the gap R2.

Specifically, when the steam F flows in the inner space 21C of the steam control valve V2, there is a case when the flow of the steam F is separated at an edge 26E positioning at the upstream side (the inlet 21A side) of the gap R2 and a vortex is generated. This vortex is reflected at an edge 21E positioning at the downstream side (the outlet 21B side) of the gap R2, a pressure fluctuation (acoustic wave) occurs, and the vortex returns to the edge 26E positioning at the upstream side (the inlet 21A side). A frequency fw of this vortex is represented by the following expression (1) (in the expression (1), "St" is the Strouhal number, "v" is a flow velocity of the steam, and "W" is a width of the gap R2).

$$fw = St \times v/W \qquad \text{expression (1)}$$

The pressure fluctuation (acoustic wave) generated as stated above is reflected at a bottom surface of the gap R2 in the gap R2, and returns to the edge 26E positioning at the upstream side (the inlet 21A side). A frequency fn of an acoustic vibration generated in the gap R2 is represented by the following expression (2) (in the expression (2), "n" is a natural number (n=1, 2, 3, . . . ), "c" is an acoustic velocity, "H" is a height of the gap R2, and "ΔH" is an open end correction value.

$$fn = (2n-1)c/4(H+\Delta H) \qquad \text{expression (2)}$$

At the gap R2, when a wave reflected at the edge 21E positioning at the downstream side (the outlet 21B side) and a wave reflected at the bottom surface of the gap R2 interfere, and the frequency fw of the vortex and the frequency fn of the acoustic vibration become the same, the pressure fluctuation (acoustic wave) is largely excited. Accordingly, the cavity tone occurs resulting from the gap R2.

Resulting from the occurrence of the cavity tone, there are cases when a temperature increases higher than normal, and when vibration is generated at the steam valve or at the pipe provided at the downstream side than the steam valve. As a result, there is a case when the steam valve or the pipe provided at downstream of the steam valve are damaged.

For example, as illustrated in FIG. 9, at the steam turbine system having the steam control valve V2 where the post-valve drain pipe P2 is provided, when a load of the steam turbine is increased under a state in which the shutoff valve is closed to perform a rated operation, there is a possibility that the post-valve drain pipe P2 and so on are broken resulting from the above-stated phenomenon. There is a case when the above-stated phenomenon occurs at the steam valve other than the steam control valve V2.

A problem is to provide a steam valve capable of suppressing and so on an occurrence of cavity tone.

BRIEF DESCRIPTION OF THE DRAWINGS

FIG. 11 is a sectional view enlargedly illustrating a part in an example of the steam control valve.

DETAILED DESCRIPTION

A steam valve according to an embodiment includes a casing, a valve rod, a valve element, and a valve seat. At the casing, the steam flows from an inlet into an inner space, and flows out of an outlet. The valve rod is accommodated in the inner space of the casing. The valve element is coupled to the valve rod at the inner space of the casing. The valve seat is fixed to the casing at the inner space of the casing, and includes a part where the valve element is in contact by moving together with the valve rod along an axis of the valve rod. Each of the valve seat and the casing includes a plane facing via a gap at a downstream side than a part where the valve seat and the valve element are in contact at the inner space. The valve seat has a cover part which covers the gap at the inner space.

Embodiments are described with reference to the drawings.

First Embodiment

[A] Configuration

Figure 1:
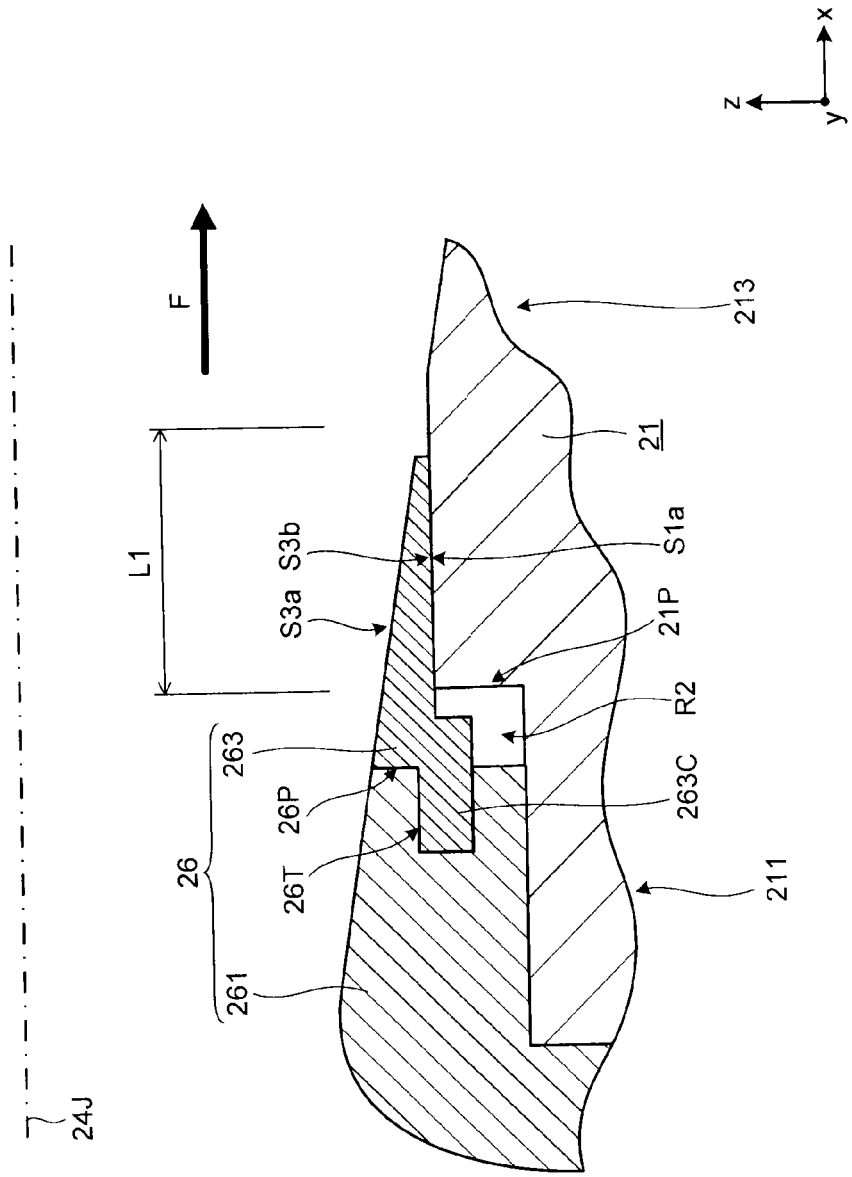
FIG. 1 is a sectional view illustrating a part of a steam control valve in a first embodiment.

FIG. 1 is a sectional view illustrating a part of a steam control valve in a first embodiment. In FIG. 1, a part where a valve seat is mounted on a casing is enlargedly illustrated at the steam control valve V2 as same as FIG. 11.

The steam control valve V2 of the present embodiment has the casing 21, the upper cover 22, the sleeve 23, the valve rod 24, the valve element 25, and the valve seat 26 as same as the case of the above-stated related art (refer to FIG. 10), but as illustrated in FIG. 1, a part of the valve seat 26 and a part of the casing 21 are different from the case of the above-stated related art. The present embodiment is the same as the case of the above-stated related art except the point and points relating to the above. Therefore, in the present embodiment, the description is appropriately not given as for parts overlapped with the above-stated description.

In the present embodiment, at the valve seat 26, the gap R2 is provided at the downstream side (the outlet 21B side) than the part where the valve element 25 (refer to FIG. 10) is in contact as same as the above-stated related art as illustrated in FIG. 1. The gap R2 is provided to be sandwiched between the plane 26P of the valve seat 26 and the plane 21P of the casing 21. However, in the present embodiment, the valve seat 26 has a valve seat main body part 261 and a cover part 263 different from the above-stated related art.

In the valve seat 26, the valve seat main body part 261 is, for example, a cylindrical tubular body, and is disposed to be coaxial to the valve rod 24. The valve seat main body part 261 is provided at a part positioning at the outlet 21B side at the casing 21. The valve seat main body part 261 is fixed to the inner peripheral surface of the casing 21.

Specifically, in the valve seat main body part 261, an outer peripheral surface (a lower surface in FIG. 1) is in parallel to the direction x (the axial direction) along the axis 24J of the valve rod 24. Here, at the valve seat main body part 261, a step is formed at the outer peripheral surface. At the valve seat main body part 261, an outside diameter of a part positioning at the upstream side (the inlet 21A side) is larger than an outside diameter of a part positioning at the downstream side (the outlet 21B side). Namely, a projecting part is formed at the outer peripheral surface of the valve seat main body part 261 positioning at the downstream side (the outlet 21B side), and the projecting part projects toward outside in the radial direction of the valve rod 24.

Besides, an inner peripheral surface of the valve seat main body part 261 includes a part inclining relative to the direction x (the axial direction) along the axis 24J of the valve rod 24 such that the upstream side (the inlet 21A side) positions at an inner side in the radial direction of the valve rod 24 than the downstream side (the outlet 21B side). Namely, at this part, an inside diameter becomes small as it goes from the upstream side (the inlet 21A side) toward the downstream side (the outlet 21B side). At the valve seat main body part 261, a part positioning at the upstream side (the inlet 21A side) in the direction x along the axis 24J of the valve rod 24 becomes a curved surface, and the valve seat 26 is mounted on the casing 21 such that the part positions at the upstream side (the inlet 21A side).

In the present embodiment, at the valve seat main body part 261, the plane 26P positioned at the end part at the downstream side (the outlet 21B side) faces the plane 21P of the casing 21 via the gap R2. A trench 26T is formed at the plane 26P. The trench 26T is formed to surround a periphery of the axis 24J of the valve rod 24 in a ring state. A center axis of the ring constituted by the trench 26T coincides with and coaxial to the axis 24J of the valve rod 24. Besides, at the inner peripheral surface of the casing 21, the gap R2 is formed at a part positioned at the downstream side (the outlet 21B side) compared to the valve seat main body part 261.

In the valve seat 26, the cover part 263 is, for example, a cylindrical tubular body, and covers the gap R2. Here, the cover part 263 covers the gap R2 and a part positioned at the downstream side (the outlet 21B side) compared to the gap R2 within the inner peripheral surface of the casing 21, and slides in accordance with thermal expansion.

Specifically, the cover part 263 includes a coupling part 263C. The coupling part 263C is formed at a part at the upstream side (the inlet 21A side) of the cover part 263, and projects in the direction x along the axis 24J of the valve rod 24. The cover part 263 is coupled to the valve seat main body part 261 by the coupling part 263C being inserted into the trench 26T of the valve seat main body part 261.

An inner peripheral surface S3a (an upper surface in FIG. 1) of the cover part 263 inclines relative to the axis 24J of the valve rod 24 such that the upstream side (the inlet 21A side) is positioned at an inner side in the radial direction of the valve rod 24 compared to the downstream side (the outlet 21B side). Namely, an inside diameter of the inner peripheral surface S3a of the cover part 263 becomes large as it goes from the upstream side (the inlet 21A side) toward the downstream side (the outlet 21B side).

On the other hand, an outer peripheral surface S3b (a lower surface in FIG. 1) of the cover part 263 is in parallel to the axis 24J of the valve rod 24. Namely, an outside diameter of the outer peripheral surface S3b of the cover part 263 is constant between the upstream side (the inlet 21A side) and the downstream side (the outlet 21B side).

Similarly, a surface S1a within the inner peripheral surface of the casing 21 of a part positioned at the downstream side (the outlet 21B side) compared to the gap R2 and a part where the outer peripheral surface of the cover part 263 slides is in parallel to the axis 24J of the valve rod 24. Namely, at the surface S1a of the part within the inner peripheral surface of the casing 21, the inside diameter is constant between the upstream side (the inlet 21A side) and the downstream side (the outlet 21B side).

Note that within the inner peripheral surface of the casing 21, the surface S1a of the part where the outer peripheral surface S3b of the cover part 263 slides is processed such that a surface roughness (Rmax, JIS B 0601-1982) becomes, for example, 1.6 S to 6.3 S.

Further, within the inner peripheral surface of the casing 21, for example, a length L1 of the surface S1a of the part where the outer peripheral surface S3b of the cover part 263 slides satisfies the following relational expression (A) relative to a valve bore d.

$$L1 \leq (\frac{1}{2}) \times d \qquad (A)$$

[B] Summary

As stated above, in the present embodiment, the valve seat 26 has the cover part 263, and the cover part 263 covers the gap R2 which is formed at the downstream side (the outlet 21B side) compared to the part where the valve element 25 is in contact with the valve seat 26. Namely, the inner space 21C of the steam control valve V2 and the gap R2 are not communicated. Therefore, in the present embodiment, when the steam F flows in the inner space 21C of the steam control valve V2, it is possible to prevent that the flow of the steam F is separated at the edge positioned at the upstream side (the inlet 21A side) at the gap R2. As a result, in the present embodiment, it is possible to prevent that the cavity tone occurs.

Figure 9:
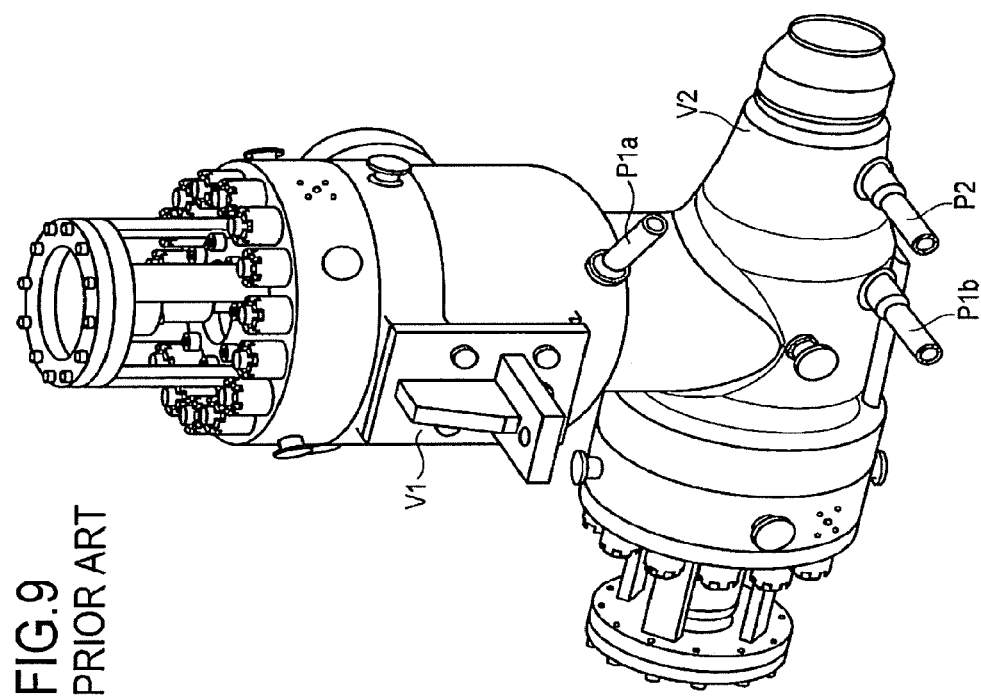
FIG. 9 is a perspective view illustrating an example of a steam stop valve and a steam control valve.

According to the above, in the present embodiment, it is possible to suppress that the steam control valve V2 or a pipe provided at downstream of the steam control valve V2 is damaged. For example, as illustrated in FIG. 9, at the steam control valve V2 where the post-valve drain pipe P2 is provided, it is possible to suppress that the post-valve drain pipe P2 is broken.

Besides, in the present embodiment, at the valve seat 26, the cover part 263 covers the gap R2 and the part positioned at the downstream side (the outlet 21B side) compared to the gap R2 within the inner peripheral surface of the casing 21 and slides. Further, at the valve seat 26, the inner peripheral surface of the cover part 263 inclines relative to the axis 24J of the valve rod 24 such that the upstream side (the inlet 21A side) is positioned at the inner side compared to the downstream side (the outlet 21B side). Therefore, in the present embodiment, it is possible to further effectively prevent that the cavity tone occurs.

Besides, in the present embodiment, at the valve seat 26, the cover part 263 is coupled to the valve seat main body part 261. Accordingly, at the valve seat 26, it is possible to appropriately exchange the cover part 263.

[C] Modified Example

Note that in the present embodiment, it is described as for the case when the valve seat 26 has the cover part 263 at the steam control valve V2, but it is not limited thereto. The cover part 263 may be provided at the valve seat 26 at the steam valve other than the steam control valve V2.

Besides, in the present embodiment, as illustrated in FIG. 9, it is described as for the case when the cover part 263 is provided at the valve seat 26 at the steam control valve V2 where the post-valve drain pipe P2 is provided, but it is not limited thereto. The cover part 263 may be provided at the valve seat 26 at a steam control valve where the post-valve drain pipe P2 is not provided.

Second Embodiment

[A] Configuration

Figure 2:
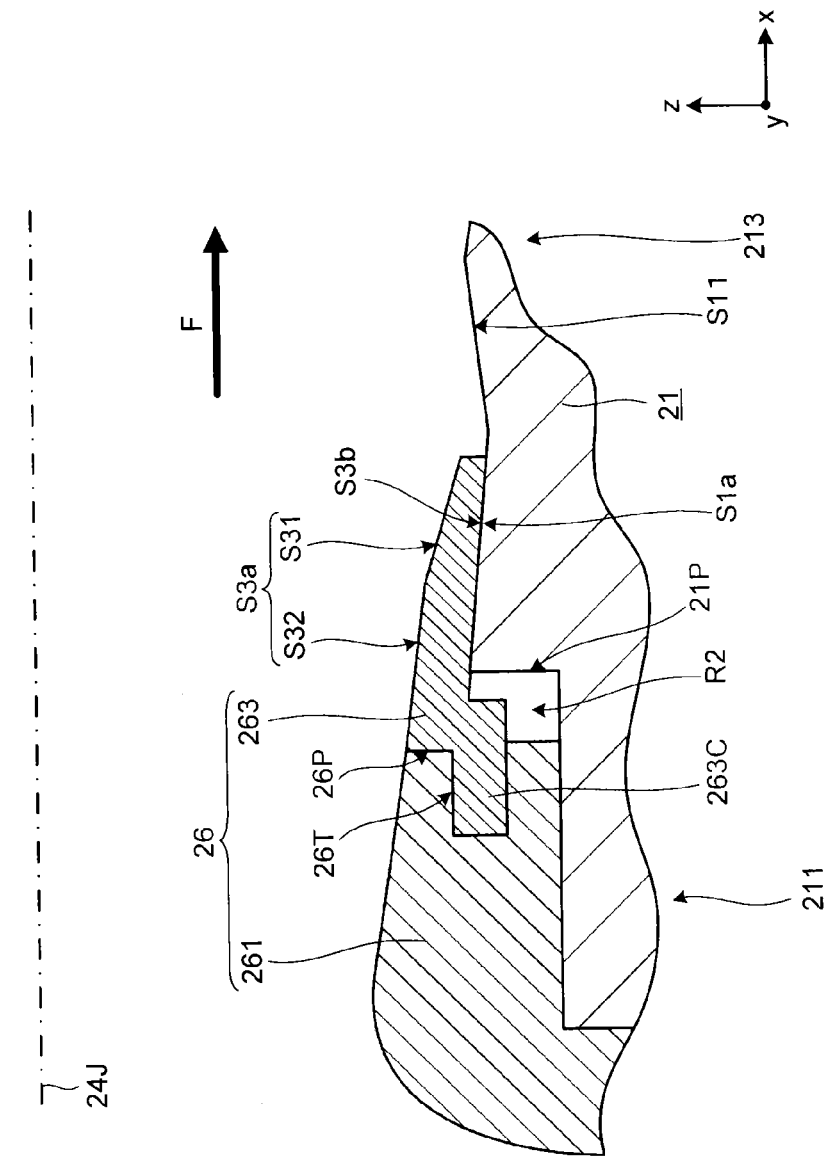
FIG. 2 is a sectional view illustrating a part of a steam control valve in a second embodiment.

FIG. 2 is a sectional view illustrating a part of a steam control valve in a second embodiment. In FIG. 2, a part where the valve seat is mounted on the casing is enlargedly illustrated at the steam control valve V2 as same as FIG. 1.

The steam control valve V2 of the present embodiment has the casing 21, the upper cover 22, the sleeve 23, the valve rod 24, the valve element 25, and the valve seat 26 as same as the case of the above-stated related art (refer to FIG. 10), but as illustrated in FIG. 2, a part of the valve seat 26 and a part of the casing 21 are different from the cases of the above-stated related art and the first embodiment. The present embodiment is the same as the cases of the above-stated related art and the first embodiment except the point and points relating to the above. Therefore, in the present embodiment, the description is appropriately not given as for parts overlapped with the above-stated description.

In the present embodiment, at the valve seat 26, the gap R2 is provided at the downstream side (the outlet 21B side) compared to the part where the valve element 25 (refer to FIG. 10) is in contact as same as the case of the above-stated related art as illustrated in FIG. 2. The gap R2 is provided to be sandwiched between the plane 26P of the valve seat 26 and the plane 21P of the casing 21. Besides, in the present embodiment, the valve seat 26 further has the cover part 263 in addition to the valve seat main body part 261 as same as the case of the first embodiment.

However, in the present embodiment, the surfaces S3b, S1a where both of the cover part 263 of the valve seat 26 and the casing 21 slide with each other incline relative to the axis 24J of the valve rod 24 such that the upstream side (the inlet 21A side) positions at the inner side in the radial direction of the valve rod 24 compared to the downstream side (the outlet 21B side) which is different from the case of the first embodiment. Namely, at the surface S3b of the part which slides with the casing 21 within the outer peripheral surface of the cover part 263, the outside diameter becomes large as it goes from the upstream side (the inlet 21A side) toward the downstream side (the outlet 21B side). Similarly, at the surface S1a of the part which slides with the cover part 263 within the inner peripheral surface of the casing 21, the inside diameter becomes large as it goes from the upstream side (the inlet 21A side) toward the downstream side (the outlet 21B side). For example, the surfaces S3b, S1a where both of the cover part 263 of the valve seat 26 and the casing 21 slide with each other incline at an angle of 2° to 2.5° relative to the axis 24J of the valve rod 24.

Besides, in the present embodiment, a surface S11 of a part positioned at the downstream side (the outlet 21B side) compared to the surface S1a where the cover part 263 of the valve seat 26 slides within the inner peripheral surface of the casing 21 inclines relative to the axis 24J of the valve rod 24 such that the upstream side (the inlet 21A side) positions at an outer side in the radial direction of the valve rod 24 compared to the downstream side (the outlet 21B side). Namely, at the surface S11 positioned at the downstream side (the outlet 21B side) compared to the surface S1a where the cover part 263 slides within the inner peripheral surface of the casing 21, an inside diameter becomes small as it goes from the upstream side (the inlet 21A side) toward the downstream side (the outlet 21B side). For example, the surface S11 of the part positioned at the downstream side (the outlet 21B side) compared to the surface S1a where the cover part 263 of the valve seat 26 slides inclines at an angle of 3° to 4° relative to the axis 24J of the valve rod 24.

Further, in the present embodiment, at the inner peripheral surface S3a of the cover part 263, a surface S31 of a part positioned at the downstream side (the outlet 21B side) has an angle inclining relative to the axis 24J of the valve rod 24 larger than a surface S32 of a part positioned at the upstream side (the inlet 21A side). Here, at the inner peripheral surface S3a of the cover part 263, the surface S32 of the part positioned at the upstream side (the inlet 21A side) inclines relative to the axis 24J of the valve rod 24 at the angle similar to the inner peripheral surface of the valve seat main body part 261. On the other hand, the surface S31 of the part positioned at the downstream side (the outlet 21B side) inclines relative to the axis 24J of the valve rod 24 at an angle larger than the inner peripheral surface of the valve seat main body part 261. For example, at the inner peripheral surface S3a of the cover part 263, the surface S31 of the part positioned at the downstream side (the outlet 21B side) has an angle inclining relative to the axis 24J of the valve rod 24 which is larger than the surface S32 of the part positioned at the upstream side (the inlet 21A side) for 3° to 4°.

[B] Summary

In the present embodiment, as same as the case of the first embodiment, the cover part 263 is provided at the valve seat 26, and the gap R2 formed at the downstream side (the outlet 21B side) compared to the part where the valve element 25 is in contact with the valve seat 26 is covered by the cover part 263. Accordingly, in the present embodiment, it is possible to prevent that the cavity tone occurs as same as the above-stated embodiment.

Third Embodiment

[A] Configuration

Figure 3:
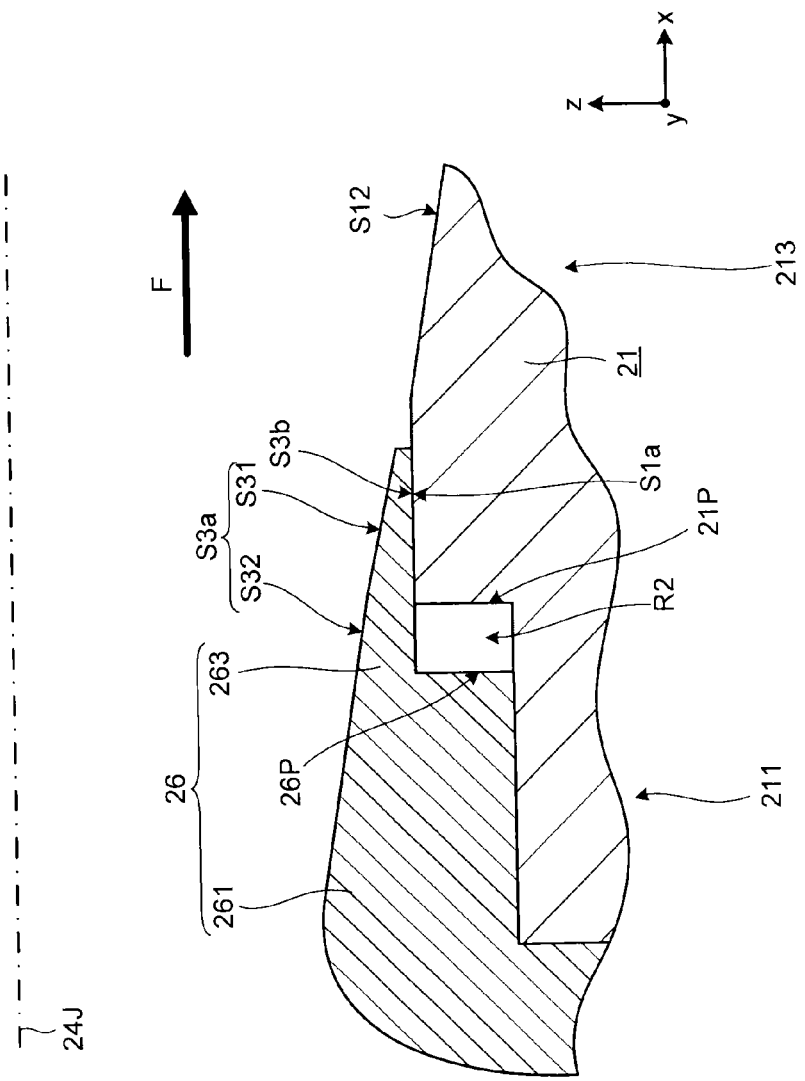
FIG. 3 is a sectional view illustrating a part of a steam control valve in a third embodiment.

FIG. 3 is a sectional view illustrating a part of a steam control valve in a third embodiment. In FIG. 3, a part where the valve seat is mounted on the casing is enlargedly illustrated at the steam control valve V2 as same as FIG. 1.

The steam control valve V2 of the present embodiment has the casing 21, the upper cover 22, the sleeve 23, the valve rod 24, the valve element 25, and the valve seat 26 as same as the case of the above-stated related art (refer to FIG. 10), but as illustrated in FIG. 3, a part of the valve seat 26 and a part of the casing 21 are different from the cases of the above-stated related art and the embodiments. The present embodiment is the same as the cases of the above-stated related art and embodiments except the point and points relating to the above. Therefore, in the present embodiment, the description is appropriately not given as for parts overlapped with the above-stated description.

In the present embodiment, at the valve seat 26, the gap R2 is provided at the downstream side (the outlet 21B side) compared to the part where the valve element 25 (refer to FIG. 10) is in contact as same as the case of the above-stated related art as illustrated in FIG. 3. The gap R2 is provided to be sandwiched between the plane 26P of the valve seat 26 and the plane 21P of the casing 21. Besides, in the present embodiment, the valve seat 26 further has the cover part 263 in addition to the valve seat main body part 261 as same as the case of the first embodiment.

However, in the present embodiment, at the valve seat 26, both of the valve seat main body part 261 and the cover part 263 are integrated which is different from the case of the first embodiment. Namely, in the present embodiment, the valve seat 26 is not one in which both of one component constituting the valve seat main body part 261 and the other component constituting the cover part 263 are coupled with each other, but one in which both are integrally formed.

Besides, in the present embodiment, at the inner peripheral surface S3a of the cover part 263, the surface S31 of the part positioning at the downstream side (the outlet 21B side) has the angle inclining relative to the axis 24J of the valve rod 24 larger than the surface S32 of the part positioning at the upstream side (the inlet 21A side) which is different from the first embodiment. Here, at the inner peripheral surface S3a of the cover part 263, the surface S32 of the part positioning at the upstream side (the inlet 21A side) inclines relative to the axis 24J of the valve rod 24 at the angle similar to the inner peripheral surface of the valve seat main body part 261. On the other hand, the surface S31 of the part positioning at the downstream side (the outlet 21B side) inclines relative to the axis 24J of the valve rod 24 at the angle larger than the inner peripheral surface of the valve seat main body part 261. The surface S31 of the part positioning at the downstream side (the outlet 21B side) at the inner peripheral surface S3a of the cover part 263 has the angle inclining relative to the axis 24J of the valve rod 24 which is the same as the case of a surface S12 of the part positioned at the downstream side (the outlet 21B side) compared to the cover part 263 at the inner peripheral surface S1a of the casing 21.

[B] Summary

In the present embodiment, as same as the cases of the first embodiment and so on, the valve seat 26 has the cover part 263, and the gap R2 formed at the downstream side (the outlet 21B side) compared to the part where the valve element 25 is in contact with the valve seat 26 is covered by the cover part 263. Accordingly, in the present embodiment, it is possible to prevent that the cavity tone occurs as same as the above-stated embodiments.

Fourth Embodiment

[A] Configuration

Figure 4:
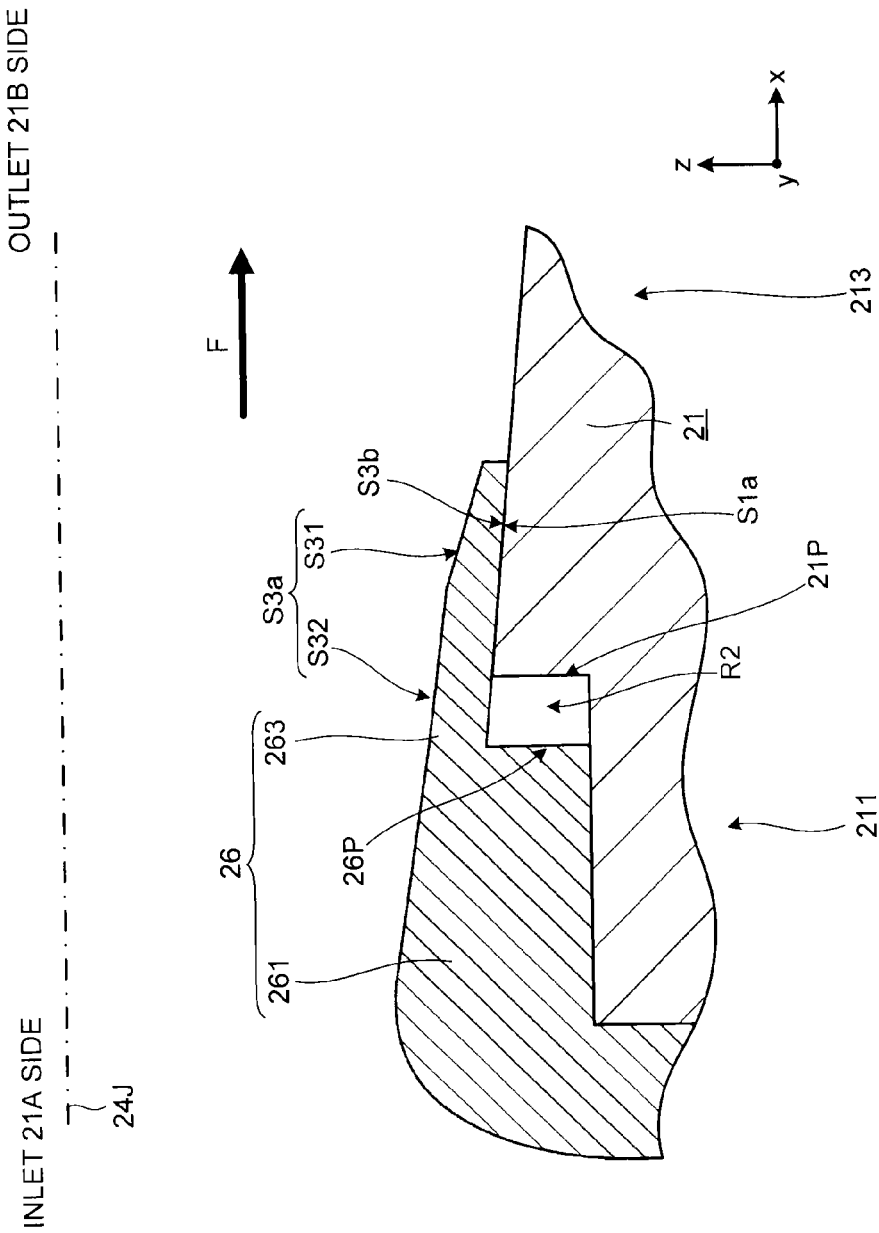
FIG. 4 is a sectional view illustrating a part of a steam control valve in a fourth embodiment.

FIG. 4 is a sectional view illustrating a part of a steam control valve in a fourth embodiment. In FIG. 4, a part where the valve seat is mounted on the casing is enlargedly illustrated at the steam control valve V2 as same as FIG. 3.

The steam control valve V2 of the present embodiment has the casing 21, the upper cover 22, the sleeve 23, the valve rod 24, the valve element 25, and the valve seat 26 as same as the case of the above-stated related art (refer to FIG. 10), but as illustrated in FIG. 4, a part of the valve seat 26 and a part of the casing 21 are different from the cases of the above-stated related art and embodiments. The present embodiment is the same as the cases of the above-stated related art and embodiments except the point and points relating to the above. Therefore, in the present embodiment, the description is appropriately not given as for parts overlapped with the above-stated description.

In the present embodiment, at the valve seat 26, the gap R2 is provided at the downstream side (the outlet 21B side) compared to the part where the valve element 25 (refer to FIG. 10) is in contact as same as the case of the above-stated related art as illustrated in FIG. 4. The gap R2 is provided to be sandwiched between the plane 26P of the valve seat 26 and the plane 21P of the casing 21. Besides, in the present embodiment, the valve seat 26 further has the cover part 263 in addition to the valve seat main body part 261 as same as the case of the third embodiment.

However, in the present embodiment, the surfaces S3b, S1a where both of the cover part 263 of the valve seat 26 and the casing 21 slide with each other incline relative to the axis 24J of the valve rod 24 such that the upstream side (the inlet 21A side) positions at the inner side in the radial direction of the valve rod 24 compared to the downstream side (the outlet 21B side) which is different from the case of the third embodiment. Namely, the outside diameter of the surface S3b which slides with the casing 21 within the outer peripheral surface of the cover part 263 becomes large as it goes from the upstream side (the inlet 21A side) toward the downstream side (the outlet 21B side). Similarly, the inside diameter of the surface S1a of the part which slides with the cover part 263 within the inner peripheral surface of the casing 21 becomes large as it goes from the upstream side (the inlet 21A side) toward the downstream side (the outlet 21B side).

Further, in the present embodiment, at the inner peripheral surface S3a of the cover part 263, the surface S31 of the part positioned at the downstream side (the outlet 21B side) has an angle inclining relative to the axis 24J of the valve rod 24 larger than the surface S32 of the part positioned at the upstream side (the inlet 21A side) which is different from the case of the third embodiment. Here, at the inner peripheral surface S3a of the cover part 263, the surface S32 of the part positioned at the upstream side (the inlet 21A side) inclines relative to the axis 24J of the valve rod 24 at an angle similar to the inner peripheral surface of the valve seat main body part 261. On the other hand, the surface S31 of the part positioned at the downstream side (the outlet 21B side)

inclines relative to the axis 24J of the valve rod 24 at an angle larger than the inner peripheral surface of the valve seat main body part 261.

[B] Summary

In the present embodiment, as same as the case of the first embodiment, at the valve seat 26, the cover part 263 is provided, and the gap R2 formed at the downstream side (the outlet 21B side) compared to the part where the valve element 25 is in contact with the valve seat 26 is covered by the cover part 263. Accordingly, in the present embodiment, it is possible to prevent that the cavity tone occurs as same as the above-stated embodiments.

Fifth Embodiment

[A] Configuration

Figure 5:
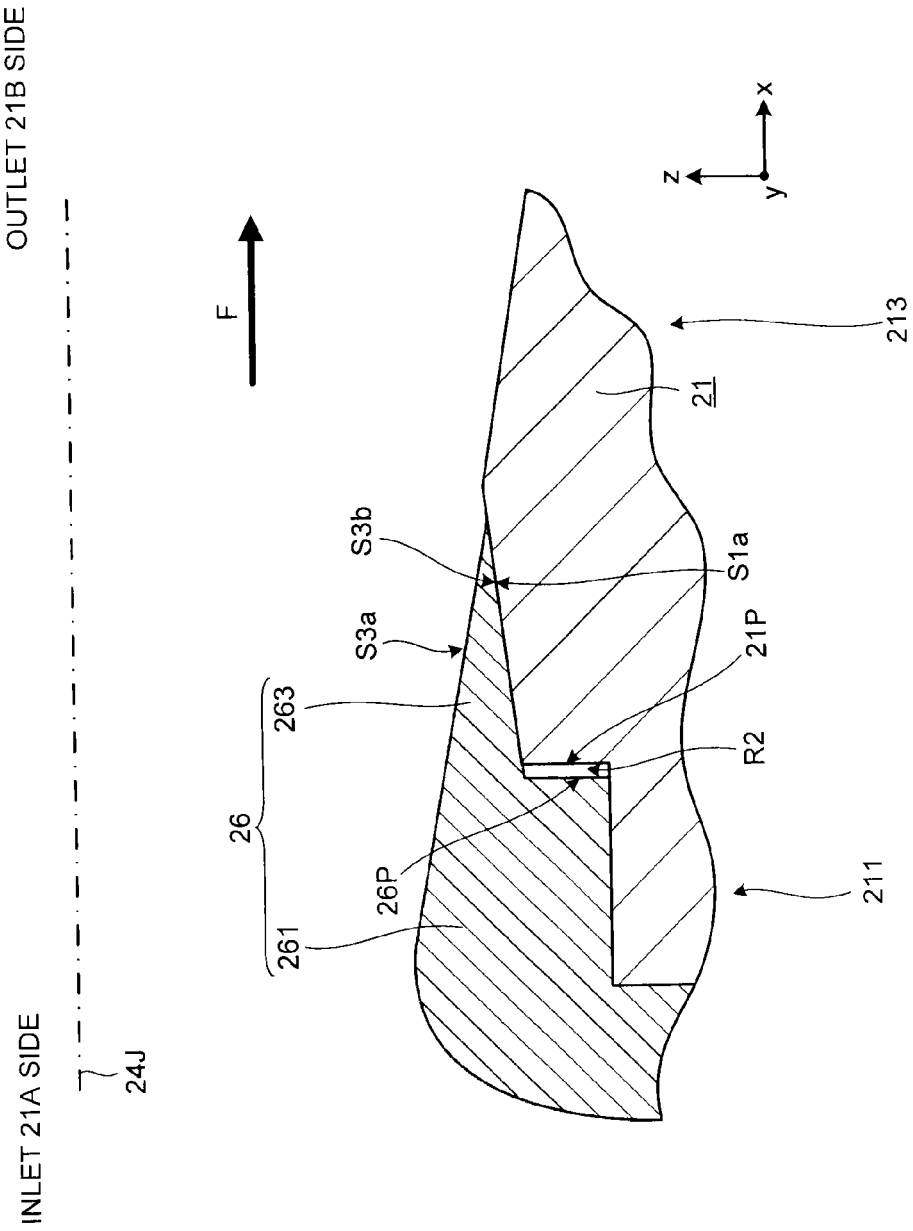
FIG. 5 is a sectional view illustrating a part of a steam control valve in a fifth embodiment.

FIG. 5 is a sectional view illustrating a part of a steam control valve in a fifth embodiment. In FIG. 5, a part where the valve seat is mounted on the casing is enlargedly illustrated at the steam control valve V2 as same as FIG. 3.

The steam control valve V2 of the present embodiment has the casing 21, the upper cover 22, the sleeve 23, the valve rod 24, the valve element 25, and the valve seat 26 as same as the case of the above-stated related art (refer to FIG. 10), but as illustrated in FIG. 5, a part of the valve seat 26 and a part of the casing 21 are different from the cases of the above-stated related art, the third embodiment, and so on. The present embodiment is the same as the cases of the above-stated related art, the third embodiment and so on except the point and points relating to the above. Therefore, in the present embodiment, the description is appropriately not given as for parts overlapped with the above-stated description.

In the present embodiment, at the valve seat 26, the gap R2 is provided at the downstream side (the outlet 21B side) compared to the part where the valve element 25 (refer to FIG. 10) is in contact as same as the case of the above-stated related art as illustrated in FIG. 5. The gap R2 is provided to be sandwiched between the plane 26P of the valve seat 26 and the plane 21P of the casing 21. Besides, in the present embodiment, the valve seat 26 further has the cover part 263 in addition to the valve seat main body part 261 as same as the cases of the third embodiment and so on.

However, in the present embodiment, the surfaces S3a, S1a where both of the cover part 263 of the valve seat 26 and the casing 21 slide with each other incline relative to the axis 24J of the valve rod 24 such that the upstream side (the inlet 21A side) positions at the outer side in the radial direction of the valve rod 24 compared to the downstream side (the outlet 21B side) which is different from the cases of the third embodiment and so on. Namely, within the outer peripheral surface of the cover part 263, the outside diameter of the surface S3b which slides with the casing 21 becomes small as it goes from the upstream side (the inlet 21A side) toward the downstream side (the outlet 21B side). Similarly, the inside diameter of the surface S1a of the part which slides with the cover part 263 within the inner peripheral surface of the casing 21 becomes small as it goes from the upstream side (the inlet 21A side) toward the downstream side (the outlet 21B side). For example, the surfaces S3b, S1a where both of the cover part 263 of the valve seat 26 and the casing 21 slide with each other incline for 3° to 4° relative to the axis 24J of the valve rod 24.

Besides, an end part positioning at the downstream side (the outlet 21B side) of the cover part 263 of the valve seat 26 gets pointed.

[B] Summary

In the present embodiment, as same as the cases of the first embodiment and so on, at the valve seat 26, the cover part 263 is provided, and the gap R2 formed at the downstream side (the outlet 21B side) than the part where the valve element 25 is in contact with the valve seat 26 is covered by the cover part 263. Accordingly, in the present embodiment, it is possible to prevent that the cavity tone occurs as same as the above-stated embodiments. In particular, in the present embodiment, the inner peripheral surface S3a of the cover part 263 and a surface of the part positioning at the downstream side than the cover part 263 within the inner peripheral surface of the casing 21 take smoothly along than the case of the third embodiment, and therefore, it is possible to suppress that the flow of the steam is disordered.

Sixth Embodiment

[A] Configuration

Figure 6:
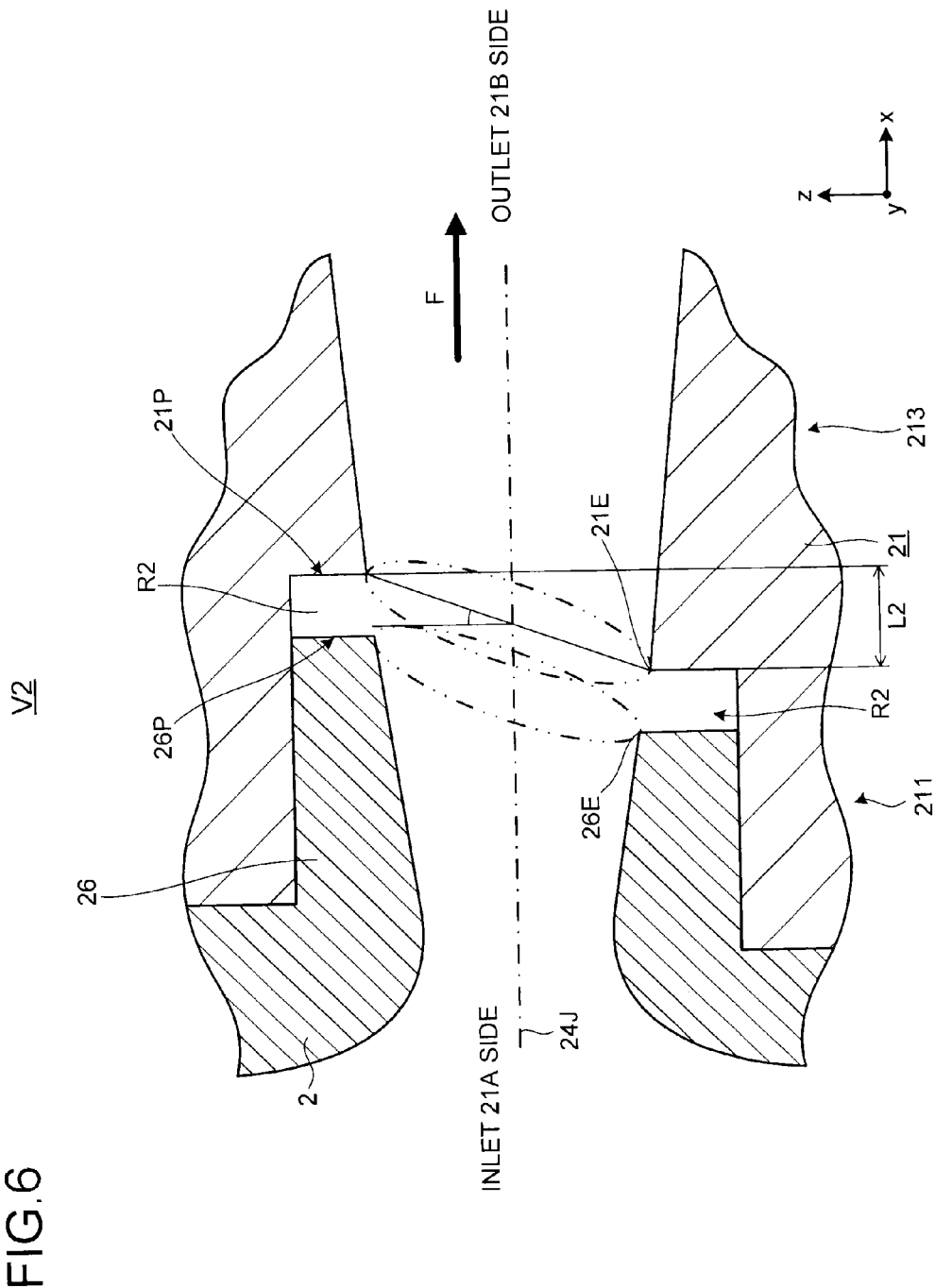
FIG. 6 is a sectional view illustrating a part of a steam control valve in a sixth embodiment.

FIG. 6 is a sectional view illustrating a part of a steam control valve in a sixth embodiment. In FIG. 6, a part where the valve seat is mounted on the casing is enlargedly illustrated at the steam control valve V2 as same as FIG. 11.

The steam control valve V2 of the present embodiment has the casing 21, the upper cover 22, the sleeve 23, the valve rod 24, the valve element 25, and the valve seat 26 as same as the case of the above-stated related art (refer to FIG. 10, FIG. 11), but as illustrated in FIG. 6, a shape of the gap R2 is different from the cases of the above-stated related art and so on. The present embodiment is the same as the cases of the above-stated related art and so on except the point and points relating to the above. Therefore, in the present embodiment, the description is appropriately not given as for parts overlapped with the above-stated description.

In the case of the above-stated related art (refer to FIG. 10), the center axis of the ring made up of the gap R2 is coaxial to the axis 24J of the valve rod 24 and they coincide with each other.

On the other hand, in the present embodiment, as illustrated in FIG. 6, the gap R2 is formed at the periphery of the axis 24J of the valve rod 24 to surround in the ring state as same as the case of the above-stated related art (refer to FIG. 10), but the ring defined by the gap R2 inclines relative to the axis 24J of the valve rod 24.

Here, the gap R2 is provided such that distances between the edge 26E positioning at the upstream side (the inlet 21A side) of the gap R2 and the outlet 21B of the casing 21 are different at a whole periphery of the axis 24J of the valve rod 24. Further, the gap R2 is provided such that distances between the edge 21E positioning at the downstream side (the outlet 21B side) of the gap R2 and the outlet 21B of the casing 21 are different at the whole periphery of the axis 24J of the valve rod 24. Specifically, circular planes surrounded by the edges 26E, 21E positioning at the inner peripheral surface side of the gap R2 incline relative to the direction x along the axis 24J of the valve rod 24 and inclines relative to the direction y perpendicular to the direction x along the axis 24J of the valve rod 24 at the horizontal plane (the xy plane).

For example, the ring formed by the gap R2 has an angle inclining relative to a plane perpendicular to the axis 24J of the valve rod 24 of 0.5° or more and 38° or less.

Further, a length L2 between a part nearest to and a part farthest from the outlet 21B of the casing 21 of the edge 21E positioning at the downstream side (the outlet 21B side) of the gap R2 satisfies, for example, the following relational expression (B) relative to the valve bore d.

$$L2 \leq (\frac{1}{2}) \times d \qquad (B)$$

[B] Summary

As stated above, in the present embodiment, the circular planes surrounded by the edges 26E, 21E positioning at the inner peripheral surface side of the gap R2 incline relative to the axis 24J of the valve rod 24. Accordingly, in the present embodiment, even if the cavity tone occurs at a part of the ring state gap R2, a possibility in which the cavity tone occurs at the other part is low because a state in which the steam flows is different from the part where the cavity tone occurs. Therefore, in the present embodiment, it is possible to prevent that a large cavity tone occurs.

As a result, in the present embodiment, it is possible to suppress that the steam control valve V2 or the pipe provided at downstream of the steam control valve V2 is damaged as same as the cases of the above-stated embodiments. For example, as illustrated in FIG. 9, at the steam control valve V2 where the post-valve drain pipe P2 is provided, it is possible to suppress that the post-valve drain pipe P2 is broken.

[C] Modified Example

In the present embodiment, the case is described in which the circular planes surrounded by the edges 26E, 21E of the gap R2 incline relative to both of the direction x along the axis 24J of the valve rod 24 and the direction y perpendicular to the direction x along the axis 24J of the valve rod 24 at the horizontal plane (the xy plane), but it is not limited thereto. The circular planes surrounded by the edges 26E, 21E of the gap R2 may incline relative to at least one of the direction x along the axis 24J of the valve rod 24 or the direction y perpendicular to the direction x along the axis 24J of the valve rod 24 at the horizontal plane (the xy plane).

In the present embodiment, at the steam control valve V2, it is described as for the case when the ring defined by the gap R2 is inclined relative to the axis 24J of the valve rod 24, but it is not limited thereto. It may be similarly constituted at the steam valve other than the steam control valve V2.

Besides, as illustrated in FIG. 9, it is described as for the case when the ring defined by the gap R2 is inclined relative to the axis 24J of the valve rod 24 at the steam control valve V2 where the post-valve drain pipe P2 is provided, but it is not limited thereto. It may be similarly constituted at the steam control valve where the post-valve drain pipe P2 is not provided.

Seventh Embodiment

[A] Configuration

Figure 7:
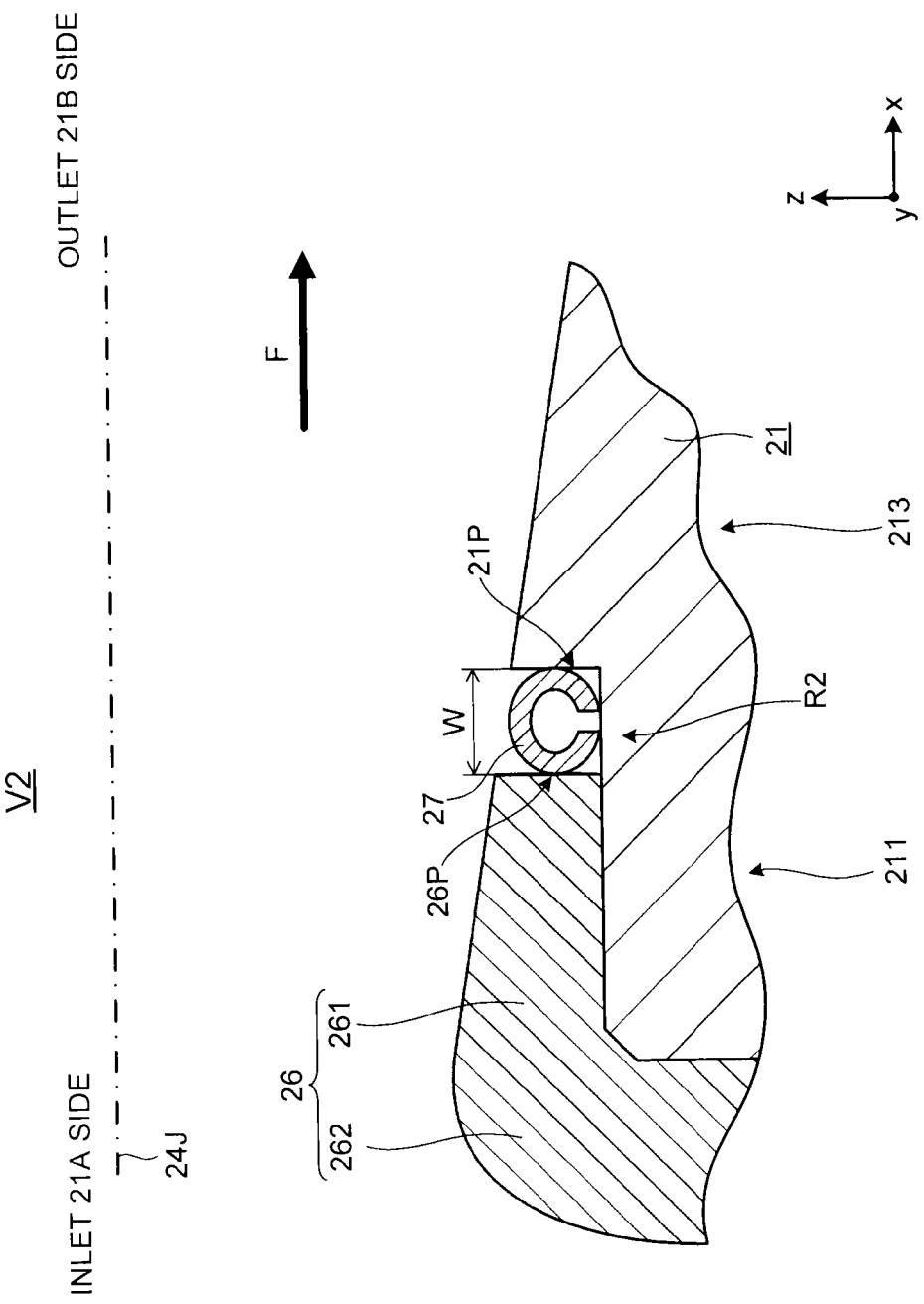
FIG. 7 is a sectional view illustrating a part of a steam control valve in a seventh embodiment.

FIG. 7 is a sectional view illustrating a part of a steam control valve in a seventh embodiment. In FIG. 7, a part where the valve seat is mounted on the casing is enlargedly illustrated at the steam control valve V2 as same as FIG. 11.

The steam control valve V2 of the present embodiment has the casing 21, the upper cover 22, the sleeve 23, the valve rod 24, the valve element 25, and the valve seat 26 as same as the case of the above-stated related art (refer to FIG. 10, FIG. 11), and further has an elastic body 27 as illustrated in FIG. 7. The present embodiment is the same as the cases of the above-stated related art, the first embodiment, and so on except the point and points relating to the above. Therefore, in the present embodiment, the description is appropriately not given as for parts overlapped with the above-stated description.

In the present embodiment, as illustrated in FIG. 7, the elastic body 27 is provided at an inside of the gap R2. The elastic body 27 is constituted to be deformed in the direction x along the axis 24J of the valve rod 24 when the valve seat 26 thermally expands at the inside of the gap R2.

Here, the elastic body 27 is a tubular body whose cross section is in a C-shape, and an opening is formed at a part of the cross section. The elastic body 27 is provided at the inside of the gap R2 so as to surround in the ring state at the periphery of the axis 24J of the valve rod 24. Besides, the elastic body 27 is provided such that the part where the opening is formed at the cross section being the C-shape turns toward the outer peripheral surface side (a lower side in FIG. 7) of the valve seat 26, and the part faces the inner peripheral surface of the casing 21. Besides, an outside diameter of the elastic body 27 is the same as the width W of the gap R2. The elastic body 27 is formed by, for example, a metal material.

[B] Summary

As stated above, in the present embodiment, the elastic body 27 is embedded at the inside of the gap R2, and the gap R2 is blocked up by the elastic body 27. Therefore, in the present embodiment, it is possible to prevent that the cavity tone occurs.

As a result, in the present embodiment, it is possible to suppress that the steam control valve V2 or the pipe provided at downstream of the steam control valve V2 is damaged as same as the cases of the above-stated embodiments. For example, as illustrated in FIG. 9, at the steam control valve V2 where the post-valve drain pipe P2 is provided, it is possible to suppress that the post-valve drain pipe P2 is broken.

[C] Modified Example

In the present embodiment, the case is described in which the elastic body 27 is provided at the inside of the gap R2 at the steam control valve V2, but it is not limited thereto. It may be similarly constituted at the steam valve other than the steam control valve V2.

Besides, as illustrated in FIG. 9, the case is described in which the cover part 263 is provided at the valve seat 26 at the steam control valve V2 where the post-valve drain pipe P2 is provided, but it is not limited thereto. It may be similarly constituted at the steam control valve where the post-valve drain pipe P2 is not provided.

Eighth Embodiment

[A] Configuration

Figure 8:
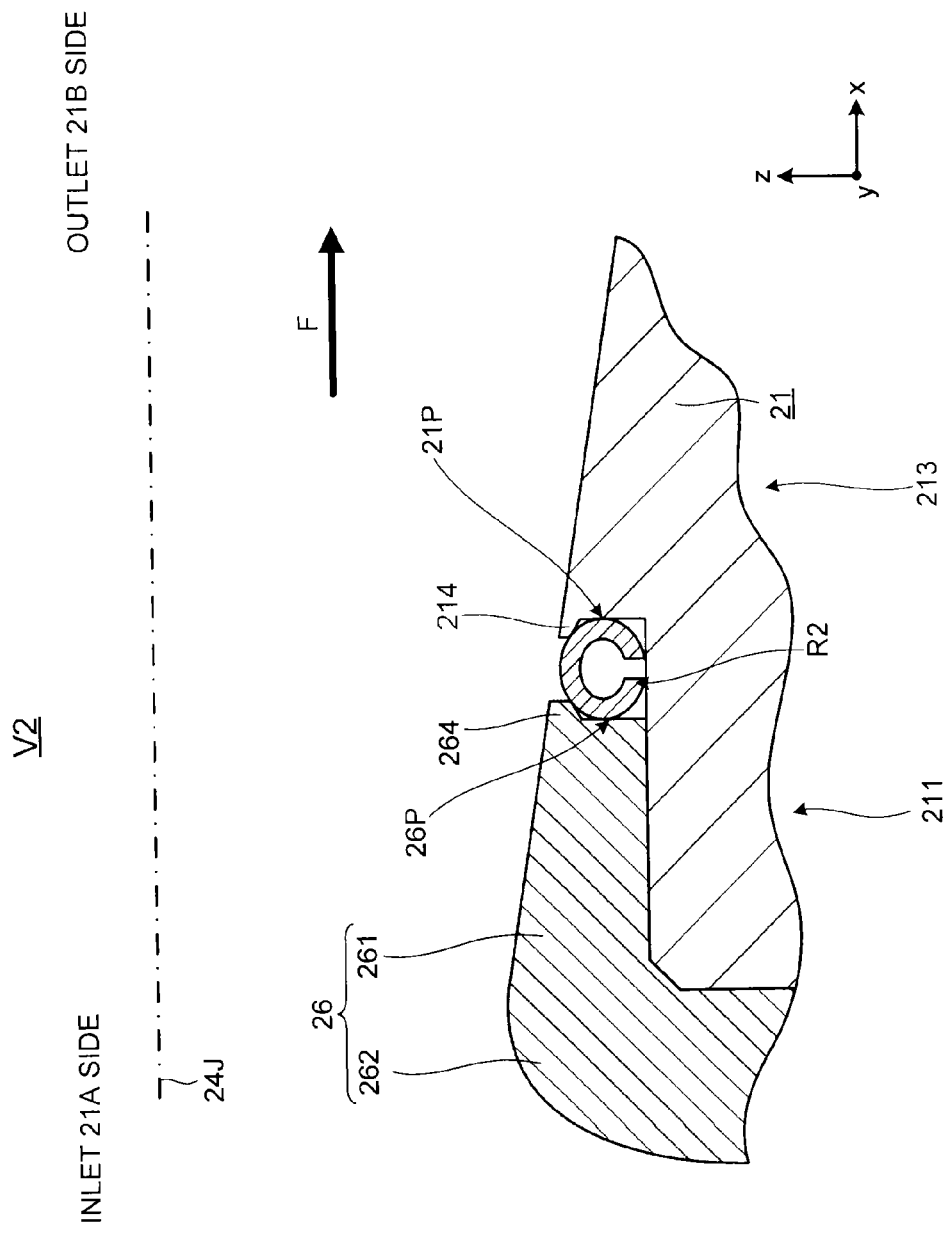
FIG. 8 is a sectional view illustrating a part of a steam control valve in a eighth embodiment.

FIG. 8 is a sectional view illustrating a part of a steam control valve in an eighth embodiment. In FIG. 8, a part where the valve seat is mounted on the casing is enlargedly illustrated at the steam control valve V2 as same as FIG. 7.

Figure 10:
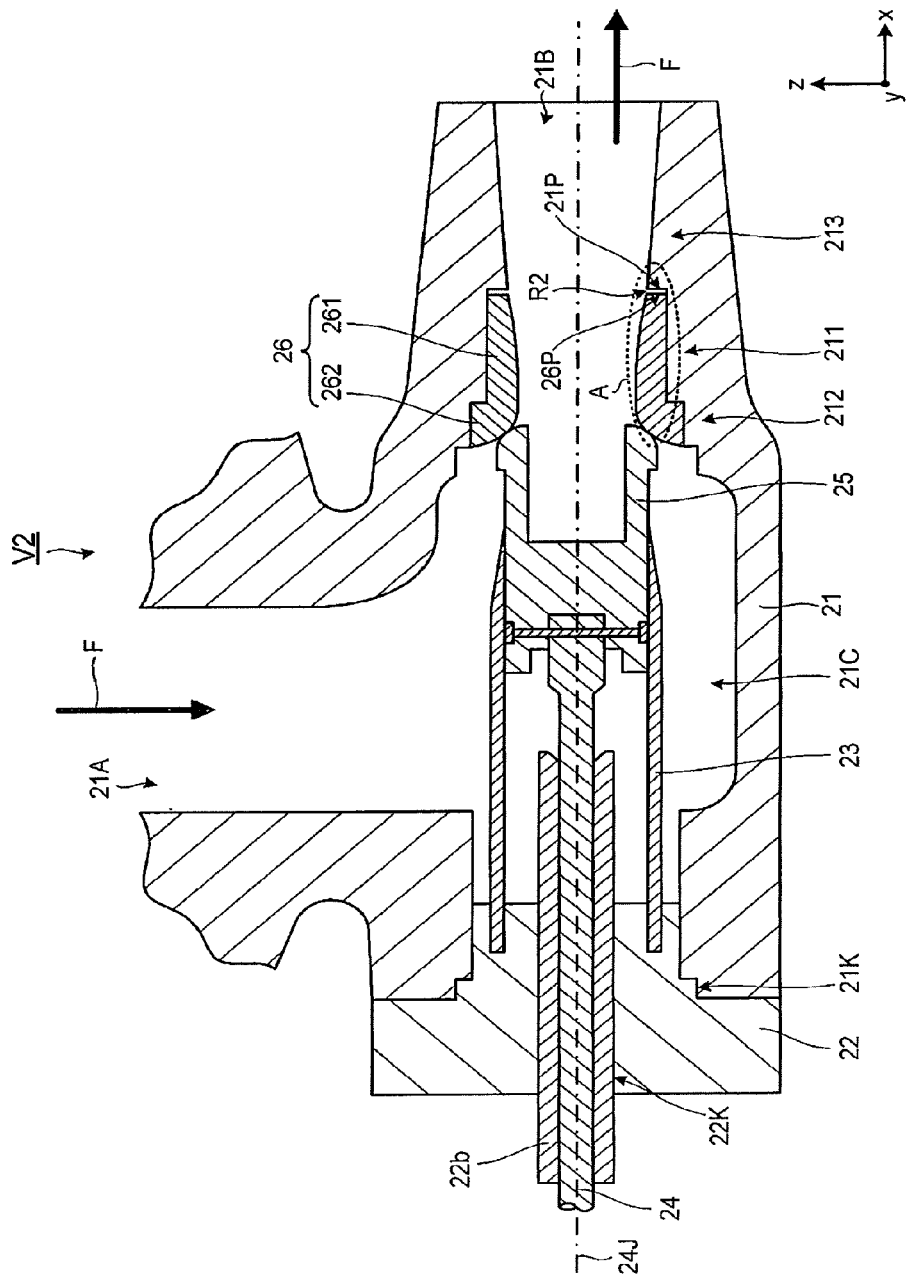
FIG. 10 is a sectional view schematically illustrating an example of a steam control valve.

The steam control valve V2 of the present embodiment has the casing 21, the upper cover 22, the sleeve 23, the valve rod 24, the valve element 25, and the valve seat 26 as same as the case of the above-stated related art (refer to FIG. 10, FIG. 11). In addition, as illustrated in FIG. 8, the steam control valve V2 of the present embodiment further has the elastic body 27 as same as the seventh embodiment. In the present embodiment, a configuration in a vicinity of the gap R2 is different from the cases of the above-stated related art, the seventh embodiment, and so on. The present embodiment is the same as the cases of the above-stated related art, the seventh embodiment and so on except the point and points relating to the above. Therefore, in the present embodiment, the description is appropriately not given as for parts overlapped with the above-stated description.

In the present embodiment, as illustrated in FIG. 8, the part where the gap R2 is formed in the valve seat 26 includes a part 264 projecting toward the gap R2 side. Besides, at the casing 21, the part where the gap R2 is formed includes a part 214 projecting toward the gap R2 side.

In the present embodiment, the gap R2 lies between the part 264 projecting toward the gap R2 side at the valve seat 26 and the part 214 projecting toward the gap R2 side at the casing 21. The elastic body 27 is held at the inside of the gap R2 by the parts 264, 214 projecting toward the gap R2 sides at the valve seat 26 and the casing 21.

[B] Summary

As stated above, in the present embodiment, it is possible to prevent that the elastic body 27 is disengaged from the inside of the gap R2 by the parts 264, 214 projecting toward the gap R2 sides at the valve seat 26 and the casing 21. In addition, it is possible to make the gap R2 small by the parts 264, 214 projecting toward the gap R2 sides at the valve seat 26 and the casing 21. Therefore, in the present embodiment, it is possible to further effectively prevent that the cavity tone occurs.

OTHERS

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A steam valve adjusting a flow rate of steam, comprising:
   a casing where the steam flows from an inlet into an inner space and flows out of an outlet;
   a valve rod accommodated in the inner space;
   a valve element coupled to the valve rod at the inner space;
   a valve seat fixed to an inner peripheral surface of the casing at the inner space, and including a part where the valve element is in contact by moving together with the valve rod along an axial direction where the valve rod extends, the valve seat and the casing forming a gap at a downstream side compared to a part where the valve seat and the valve element are in contact at the inner space; and
   a cover part covering the gap at the inner space so that the gap is not exposed to the steam flowing in the inner space;
   wherein the cover part is made up to cover the gap and a part positioned at a downstream side compared to the nap within the inner peripheral surface of the casing and to slide on the part of the inner peripheral surface of the casing.

2. The steam valve according to claim 1,
   wherein the valve seat has a valve seat main body part including the part where the valve element is in contact, and the cover part is coupled to the valve seat main body part.

3. The steam valve according to claim 1,
   wherein the valve seat has a valve seat main body part including the part where the valve element is in contact, and the valve seat main body part and the cover part are integrally formed.

4. The steam valve according to claim 1,
   wherein surfaces, where both of the valve seat and the casing slide with each other, incline relative to the axial direction of the valve rod such that an upstream side positions at an inner side compared to a downstream side in a radial direction of the valve rod.

5. The steam valve according to claim 4,
   wherein a part positioned at a downstream side compared to the part where the valve seat slides within the inner peripheral surface of the casing inclines relative to the axial direction of the valve rod such that an upstream side positions at an outer side compared to the downstream side in the radial direction of the valve rod.

6. The steam valve according to claim 1,
   wherein an inner peripheral surface of the cover part inclines relative to the axial direction of the valve rod such that an upstream side positions at an inner side compared to a downstream side is located at an inner side in the radial direction of the valve rod.

7. The steam valve according to claim 6,
   wherein a part positioned at the downstream side within the inner peripheral surface of the cover part has an angle inclining relative to the axial direction of the valve rod larger than a part positioned at the upstream side.

8. The steam valve according to claim 1,
   wherein surfaces where both of the valve seat and the casing slide with each other incline relative to the axial direction of the valve rod such that an upstream side positions at an outer side compared to a downstream side in a radial direction of the valve rod.

* * * * *